United States Patent
Li et al.

(10) Patent No.: US 9,971,204 B2
(45) Date of Patent: May 15, 2018

(54) METHOD FOR MANUFACTURING LIQUID CRYSTAL DISPLAY PANEL

(71) Applicant: Shenzhen China Star Optoelectronics Technology Co., Ltd., Shenzhen (CN)

(72) Inventors: Xiang Li, Shenzhen (CN); Chungching Hsieh, Shenzhen (CN); Yongchao Zhao, Shenzhen (CN); Rentang Zhao, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 126 days.

(21) Appl. No.: 15/120,750

(22) PCT Filed: Apr. 22, 2016

(86) PCT No.: PCT/CN2016/080033
§ 371 (c)(1),
(2) Date: Aug. 23, 2016

(87) PCT Pub. No.: WO2017/173675
PCT Pub. Date: Oct. 12, 2017

(65) Prior Publication Data
US 2017/0285412 A1 Oct. 5, 2017

(30) Foreign Application Priority Data
Apr. 5, 2016 (CN) .......................... 2016 1 0205685

(51) Int. Cl.
*G02F 1/1337* (2006.01)
*G02F 1/1341* (2006.01)

(52) U.S. Cl.
CPC ...... *G02F 1/133788* (2013.01); *G02F 1/1341* (2013.01); *G02F 2001/13415* (2013.01)

(58) Field of Classification Search
CPC ............. G02F 1/133788; G02F 1/1341; G02F 2001/13415; G02F 1/133351; G02F 1/1303; H01J 9/24; H01K 3/26; C03C 27/00; C03C 17/00; C04B 37/00
See application file for complete search history.

(56) References Cited

U.S. PATENT DOCUMENTS

2013/0040528 A1* 2/2013 Lee .................. G02F 1/1303
445/25
2013/0342803 A1* 12/2013 Chiu .................. G02F 1/1341
349/190

* cited by examiner

*Primary Examiner* — Joseph L Williams
*Assistant Examiner* — Jose M Diaz

(57) ABSTRACT

A method for manufacturing a liquid crystal display panel is provided. The method includes the following steps of: drop-filling liquid crystal molecules on a color film substrate having a seal frame, wherein the liquid crystal molecules are doped with thermal reactive monomers; and heat-curing a frame, and simultaneously making the thermal reactive monomers in the liquid crystal molecules into a polymer on the surface of the alignment film. The reliability of the alignment film is improved by the present invention.

20 Claims, 2 Drawing Sheets

METHOD FOR MANUFACTURING LIQUID CRYSTAL DISPLAY PANEL

RELATED APPLICATIONS

This application is a National Phase of PCT Patent Application No. PCT/CN2016/080033 having International filing date of Apr. 22, 2016, which claims the benefit of priority of Chinese Patent Application No. 201610205685.2 filed on Apr. 5, 2016. The contents of the above applications are all incorporated by reference as if fully set forth herein in their entirety.

FIELD AND BACKGROUND OF THE INVENTION

The present invention relates to a field of panel manufacture, and more specifically to a method for manufacturing a liquid crystal display (LCD) panel.

With the development of science and technology, people's requirements for display effects of LCD panels are higher and higher. An alignment film is disposed on an array substrate and a color film substrate in an LCD panel, respectively, in order to increase the display response speed of the LCD panels. The alignment film is used for providing a pre-tilt angle for liquid crystal molecules in a liquid crystal layer.

Existing alignment films are produced by a photo-alignment method. That is, an isotropic alignment film is coated on the surface of an array substrate and the surface of a color film substrate, respectively, and then the isotropic alignment film is irradiated by an ultraviolet linearly polarized light, so that the chemical reaction of the isotropic alignment film occurs to transform into an anisotropy, thereby playing a role of alignment to the liquid crystal molecules. The entire surface area of the alignment film can be aligned in a certain direction by the photo-alignment method, so as to be able to preferably avoid the poor local alignment of a rubbing alignment.

However, the anchoring force of the alignment film to the liquid crystal molecules in the photo-alignment method consists entirely of a chemical force between the polymer chains of the surface of the alignment film and the liquid crystal molecules, and the anchoring force is poor, thereby likely leading to the poor reliability of the alignment film.

Therefore, there is a need to provide a method for manufacturing an LCD panel, so as to overcome the disadvantage in the prior art.

SUMMARY OF THE INVENTION

An object of the present invention is to provide a method for manufacturing an LCD panel, in which an alignment film has a higher reliability, thereby solving the technical problems of the poor reliability of an alignment film in an existing LCD panel.

The embodiment of the present invention provides a method for manufacturing an LCD panel. The method includes the following steps of:

coating an isotropic alignment film onto a color film substrate and an array substrate, respectively;

irradiating the isotropic alignment film by a linearly polarized ultraviolet light, to transform the isotropic alignment film into an anisotropic alignment film, thereby forming a pre-tilt angle of the alignment film;

drop-filling liquid crystal molecules on the color film substrate having a seal frame, wherein the liquid crystal molecules are doped with thermal reactive monomers;

aligning and bonding the color film substrate and the corresponding array substrate;

providing a frame around the liquid crystal display panel; and heat-curing the frame, and simultaneously making the thermal reactive monomers in the liquid crystal molecules into a polymer on the surface of the alignment film, thereby improving the anchoring force of the alignment film to the liquid crystal molecules, wherein the heat-curing has a temperature between 50° C. and 80° C., and the heat-curing has an operation time between 10 minutes and 20 minutes.

In the method for manufacturing the LCD panel of the present invention, after the step in which the isotropic alignment film is coated, and before the step in which the isotropic alignment film is irradiated by the linearly polarized ultraviolet light, the method further includes the following step of:

pre-baking the alignment film, so that the alignment film has a uniform thickness, and volatizing an organic solvent in the alignment film.

In the method for manufacturing the LCD panel of the present invention, the pre-baking has a temperature between 80° C. and 90° C.

In the method for manufacturing the LCD panel of the present invention, the pre-baking has an operation time between 5 minutes and 10 minutes.

In the method for manufacturing the LCD panel of the present invention, after the step in which the alignment film is pre-baked, and before the step in which the isotropic alignment film is irradiated by the linearly polarized ultraviolet light, the method further includes the following step of:

baking the alignment film at high temperatures, thereby curing the alignment film.

In the method for manufacturing the LCD panel of the present invention, after the step in which the isotropic alignment film is irradiated by the linearly polarized ultraviolet light, and before the step in which the liquid crystal molecules are drop-filled on the color film substrate having the seal frame, the method further includes the following step of:

baking the alignment film at high temperatures, thereby curing the alignment film.

In the method for manufacturing the LCD panel of the present invention, the baking at high temperatures has a temperature between 180° C. and 220° C., and the baking at high temperatures has an operation time between 40 minutes and 60 minutes.

In the method for manufacturing the LCD panel of the present invention, after the step in which the frame is provided around the liquid crystal display panel, and before the step in which the frame is heat-cured, the method further includes the following step of:

ultraviolet-curing the frame.

The embodiment of the present invention provides a method for manufacturing an LCD panel, which includes the following steps of:

coating an isotropic alignment film onto a color film substrate and an array substrate, respectively;

irradiating the isotropic alignment film by a linearly polarized ultraviolet light, to transform the isotropic alignment film into an anisotropic alignment film, thereby forming a pre-tilt angle of the alignment film;

drop-filling liquid crystal molecules on the color film substrate having a seal frame, wherein the liquid crystal molecules are doped with thermal reactive monomers;
aligning and bonding the color film substrate and the corresponding array substrate;
providing a frame around the liquid crystal display panel; and
heat-curing the frame, and simultaneously making the thermal reactive monomers in the liquid crystal molecules into a polymer on the surface of the alignment film, thereby improving the anchoring force of the alignment film to the liquid crystal molecules.

In the method for manufacturing the LCD panel of the present invention, the heat-curing has a temperature between 50° C. and 80° C.

In the method for manufacturing the LCD panel of the present invention, the heat-curing has an operation time between 10 minutes and 20 minutes.

In the method for manufacturing the LCD panel of the present invention, after the step in which the isotropic alignment film is coated, and before the step in which the isotropic alignment film is irradiated by the linearly polarized ultraviolet light, the method further includes the following step of:
pre-baking the alignment film, so that the alignment film has a uniform thickness, and volatizing an organic solvent in the alignment film.

In the method for manufacturing the LCD panel of the present invention, the pre-baking has a temperature between 80° C. and 90° C.

In the method for manufacturing the LCD panel of the present invention, the pre-baking has an operation time between 5 minutes and 10 minutes.

In the method for manufacturing the LCD panel of the present invention, after the step in which the alignment film is pre-baked, and before the step in which the isotropic alignment film is irradiated by the linearly polarized ultraviolet light, the method further includes the following step of:
baking the alignment film at high temperatures, thereby curing the alignment film.

In the method for manufacturing the LCD panel of the present invention, after the step in which the isotropic alignment film is irradiated by the linearly polarized ultraviolet light, and before the step in which the liquid crystal molecules are drop-filled on the color film substrate having the seal frame, the method further includes the following step of:
baking the alignment film at high temperatures, thereby curing the alignment film.

In the method for manufacturing the LCD panel of the present invention, the baking at high temperatures has a temperature between 180° C. and 220° C.

In the method for manufacturing the LCD panel of the present invention, the baking at high temperatures has an operation time between 40 minutes and 60 minutes.

In the method for manufacturing the LCD panel of the present invention, after the step in which the frame is provided around the liquid crystal display panel, and before the step in which the frame is heat-cured, the method further includes the following step of:
ultraviolet-curing the frame.

In comparison to a method for manufacturing the existing LCD panel, the reliability of the alignment film is improved by doping the liquid crystal molecules with the thermal reactive monomers and by heat-curing the frame to form the polymer on the surface of the alignment film in the method for manufacturing the LCD panel of the present invention, thereby solving the technical problems of the poor reliability of the alignment film in the existing LCD panel.

The above objectives, and other objectives, features, advantages, and embodiments of the present invention will be better understood from the following description being considered in connection with the accompanied drawings and in which a preferred embodiment of the invention is illustrated by way of example.

DESCRIPTION OF SPECIFIC EMBODIMENTS OF THE INVENTION

Figure 1:
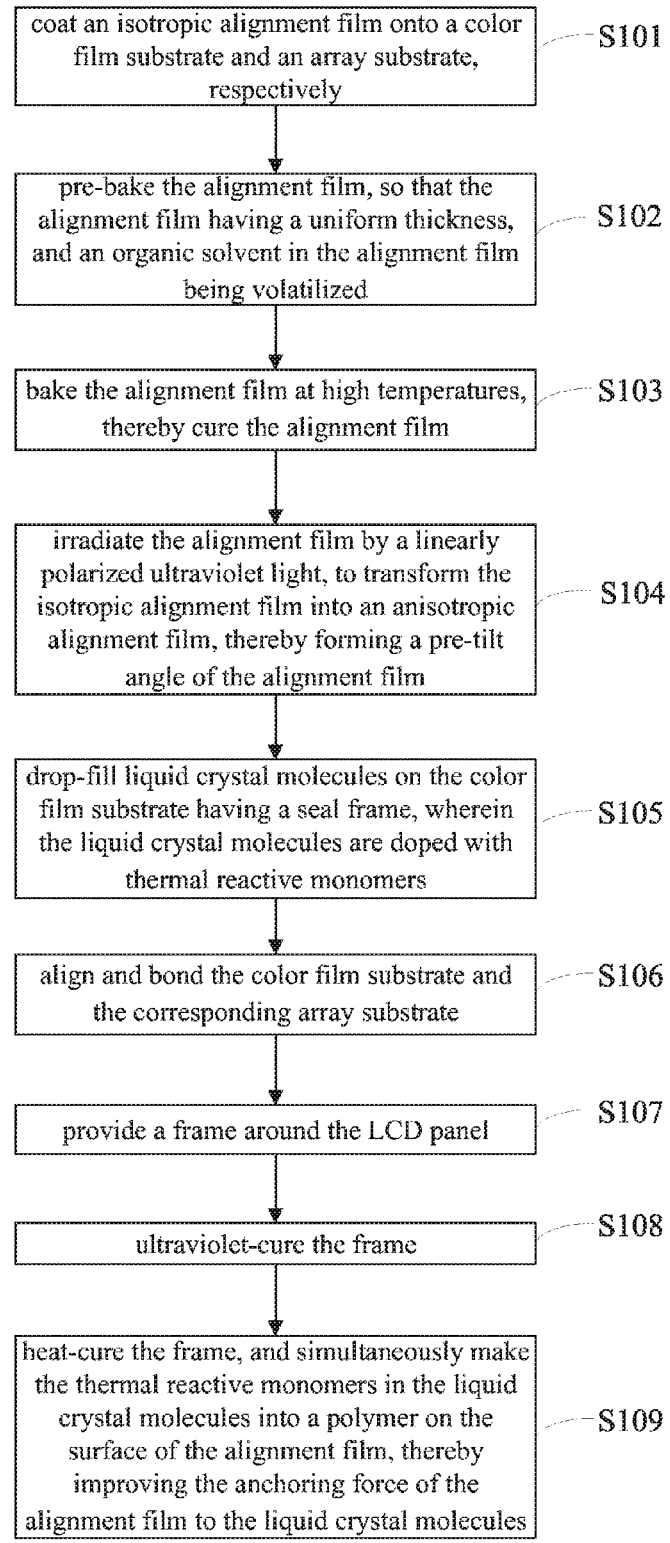
FIG. 1 is a flow chart of a method according to a preferred embodiment of the present invention for manufacturing an LCD panel.

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", "left", "right", "inside", "outside", "side", etc., is used with reference to the orientation of the figure(s) being described. As such, the directional terminology is used for purposes of illustration and is in no way limiting.

Throughout this specification and in the drawings like parts will be referred to by the same reference numerals.

Please refer to FIG. 1. FIG. 1 is a flow chart of a method according to a preferred embodiment of the present invention for manufacturing an LCD panel. The method according to the preferred embodiment for manufacturing the LCD panel includes the following steps:

step S101: coating an isotropic alignment film onto a color film substrate and an array substrate, respectively;

step S102: pre-baking the alignment film, so that the alignment film has a uniform thickness, and volatizing an organic solvent in the alignment film;

step S103: baking the alignment film at high temperatures, thereby curing the alignment film;

step S104: irradiating the isotropic alignment film by a linearly polarized ultraviolet light, to transform the isotropic alignment film into an anisotropic alignment film, thereby forming a pre-tilt angle of the alignment film;

step S105: drop-filling liquid crystal molecules on the color film substrate having a seal frame, wherein the liquid crystal molecules are doped with thermal reactive monomers;

step S106: aligning and bonding the color film substrate and the corresponding array substrate;

step S107: providing a frame around the LCD panel;

step S108: ultraviolet-curing the frame; and step S109: heat-curing the frame, and simultaneously making the thermal reactive monomers in the liquid crystal molecules into a polymer on the surface of the alignment film, thereby improving the anchoring force of the alignment film to the liquid crystal molecules.

A specific process of each step in the method according to the preferred embodiment for manufacturing the LCD panel will be described in further detail hereinafter.

In step S101, the color film substrate and the corresponding array substrate are provided. Then, the isotropic alignment film is coated on the color film substrate and the array substrate, respectively. Then, step S102 is executed.

In step S102, the alignment film is pre-baked, so that the alignment film has the uniform thickness, and the organic solvent in the alignment film is volatilized. Preferably, the pre-baking has a temperature between 80° C. and 90° C. The pre-baking has an operation time between 5 minutes and 10 minutes. Then, step S103 is executed.

In step S103, the alignment film is baked at high temperatures, so that the alignment film is cured. Preferably, the baking at high temperatures has a temperature between 180° C. and 220° C. Preferably, the baking at high temperatures has an operation time between 40 minutes and 60 minutes. Then, step S104 is executed.

In step S104, the isotropic alignment film is irradiated by the linearly polarized ultraviolet light, so that the isotropic alignment film is transformed into the anisotropic alignment film, thereby forming the pre-tilt angle of the alignment film. Then, step S105 is executed.

In step S105, the liquid crystal molecules are drop-filled on the color film substrate having the seal frame. The liquid crystal molecules are doped with the thermal reactive monomers. The aggregative reaction of the thermal reactive monomers will occurred at temperatures over 50° C. to form a polymer. Then, step S106 is executed.

In step S106, the color film substrate and the corresponding array substrate are aligned and bonded to form the liquid crystal cell of the LCD panel. Then, step S107 is executed.

In step S107, the frame is provided around the aligned and bonded LCD panel. Then, step S108 is executed.

In step S108, the frame is pre-cured by an ultraviolet light. Then, step S109 is executed.

In step S109, the pre-baked frame is heat-cured. Preferably, the heat-curing has a temperature between 50° C. and 80° C. Preferably, the heat-curing has an operation time between 10 minutes and 20 minutes. Therefore, the thermal reactive monomers in the liquid crystal molecules are made into the polymer on the surface of the alignment film during the heat-curing. The anchoring force of the alignment film to the liquid crystal molecules can be improved by the polymer, thereby improving the reliability of the alignment film of the LCD panel.

In this way, the method according to the preferred embodiment for manufacturing the LCD panel is completed.

In the method for manufacturing the LCD panel of the preferred embodiment, the reliability of the alignment film is improved by doping the liquid crystal molecules with the thermal reactive monomers and by heat-curing the frame to form the polymer on the surface of the alignment film.

Figure 2:
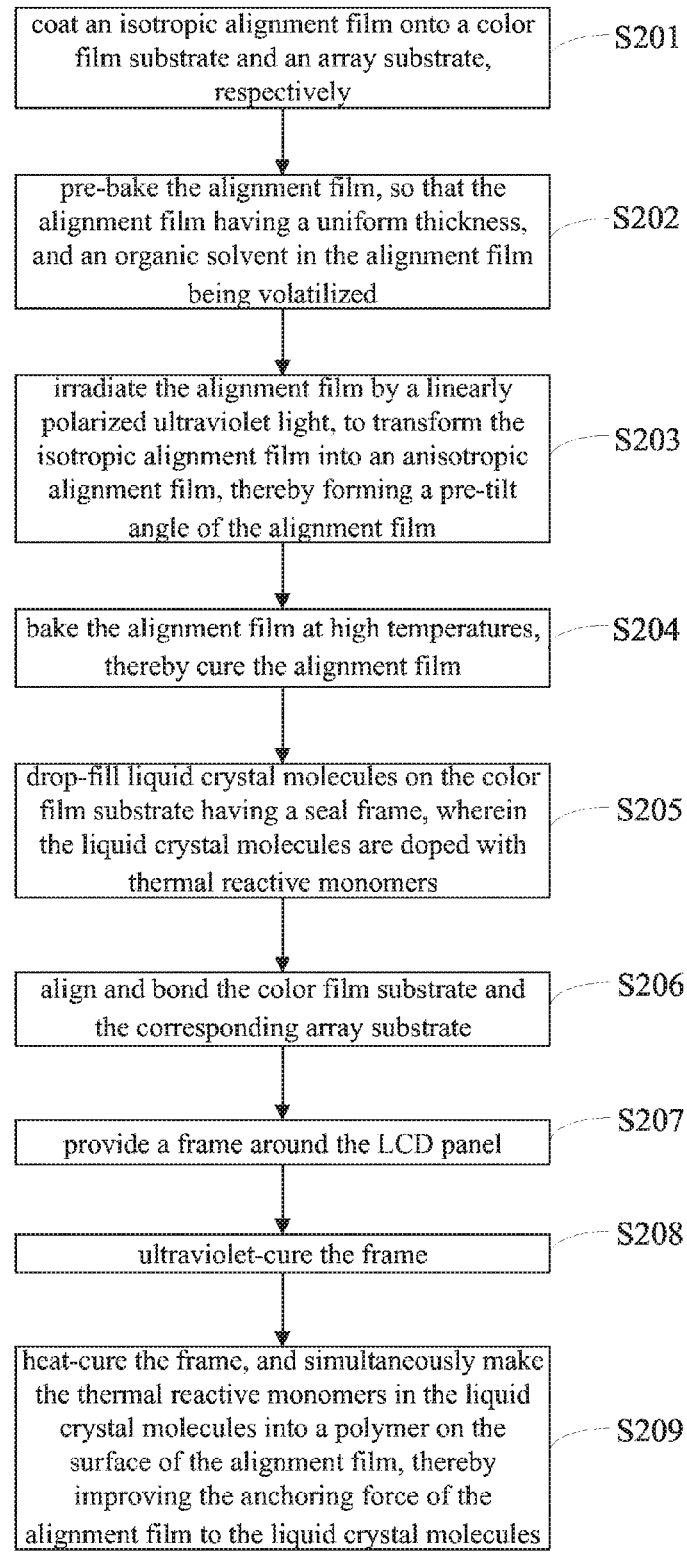
FIG. 2 is a flow chart of a method according to a second preferred embodiment of the present invention for manufacturing an LCD panel.

Please refer to FIG. 2. FIG. 2 is a flow chart of a method according to a second preferred embodiment of the present invention for manufacturing an LCD panel. The method according to the preferred embodiment for manufacturing the LCD panel includes the following steps:

step S201: coating an isotropic alignment film onto a color film substrate and an array substrate, respectively;

step S202: pre-baking the alignment film, so that the alignment film has a uniform thickness, and volatizing an organic solvent in the alignment film;

step S203: irradiating the isotropic alignment film by a linearly polarized ultraviolet light, to transform the isotropic alignment film into an anisotropic alignment film, thereby forming a pre-tilt angle of the alignment film;

step S204: baking the alignment film at high temperatures, thereby curing the alignment film;

step S205: drop-filling liquid crystal molecules on the color film substrate having a seal frame, wherein the liquid crystal molecules are doped with thermal reactive monomers;

step S206: aligning and bonding the color film substrate and the corresponding array substrate;

step S207: providing a frame around the LCD panel;

step S208: ultraviolet-curing the frame;

step S209: heat-curing the frame, and simultaneously making the thermal reactive monomers in the liquid crystal molecules into a polymer on the surface of the alignment film, thereby improving the anchoring force of the alignment film to the liquid crystal molecules.

On the basis of the first preferred embodiment, in the method for manufacturing the LCD panel of the preferred embodiment, after the pre-tilt angle of the alignment film is formed, and then the alignment film is baked at high temperatures, so that the curing of the alignment film is more efficient, thereby avoiding the effect of the transition on the curing of the alignment film.

The reliability of the alignment film is improved by doping the liquid crystal molecules with the thermal reactive monomers and by heat-curing the frame to form the polymer on the surface of the alignment film in the method for manufacturing the LCD panel of the present invention, thereby solving the technical problems of the poor reliability of an alignment film in an existing LCD panel.

It should be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for manufacturing a liquid crystal display panel, comprising the following steps of:

coating an isotropic alignment film onto a color film substrate and an array substrate, respectively;

irradiating the isotropic alignment film by a linearly polarized ultraviolet light, to transform the isotropic alignment film into an anisotropic alignment film, thereby forming a pre-tilt angle of the alignment film;

drop-filling liquid crystal molecules on the color film substrate having a seal frame, wherein the liquid crystal molecules are doped with thermal reactive monomers;

aligning and bonding the color film substrate and the corresponding array substrate;

providing a frame around the liquid crystal display panel; and heat-curing the frame, and simultaneously making the thermal reactive monomers in the liquid crystal molecules into a polymer on a surface of the alignment film, thereby improving an anchoring force of the alignment film to the liquid crystal molecules, wherein the heat-curing has a temperature between 50° C. and 80° C., and the heat-curing has an operation time between 10 minutes and 20 minutes.

2. The method for manufacturing the liquid crystal display panel of claim 1, wherein after the step in which the isotropic alignment film is coated, and before the step in which the isotropic alignment film is irradiated by the linearly polarized ultraviolet light, the method further comprises the following step of:

pre-baking the alignment film, so that the alignment film having a uniform thickness, and an organic solvent in the alignment film being volatilized.

3. The method for manufacturing the liquid crystal display panel of claim 2, wherein the pre-baking has a temperature between 80° C. and 90° C.

4. The method for manufacturing the liquid crystal display panel of claim 2, wherein the pre-baking has an operation time between 5 minutes and 10 minutes.

5. The method for manufacturing the liquid crystal display panel of claim 1, wherein after the step in which the alignment film is pre-baked, and before the step in which the isotropic alignment film is irradiated by the linearly polarized ultraviolet light, the method further comprises the following step of:
baking the alignment film at high temperatures, thereby curing the alignment film.

6. The method for manufacturing the liquid crystal display panel of claim 1, wherein after the step in which the isotropic alignment film is irradiated by the linearly polarized ultraviolet light, and before the step in which the liquid crystal molecules are drop-filled on the color film substrate having the seal frame, the method further comprises the following step of:
baking the alignment film at high temperatures, thereby curing the alignment film.

7. The method for manufacturing the liquid crystal display panel of claim 5, wherein the baking at high temperatures has a temperature between 180° C. and 220° C., and the baking at high temperatures has an operation time between 40 minutes and 60 minutes.

8. The method for manufacturing the liquid crystal display panel of claim 6, wherein the baking at high temperatures has a temperature between 180° C. and 220° C., and the baking at high temperatures has an operation time between 40 minutes and 60 minutes.

9. The method for manufacturing the liquid crystal display panel of claim 1, wherein after the step in which the frame is provided around the liquid crystal display panel, and before the step in which the frame is heat-cured, the method further comprises the following step of:
ultraviolet-curing the frame.

10. A method for manufacturing a liquid crystal display panel, comprising the following steps of:
coating an isotropic alignment film onto a color film substrate and an array substrate, respectively;
irradiating the isotropic alignment film by a linearly polarized ultraviolet light, to transform the isotropic alignment film into an anisotropic alignment film, thereby forming a pre-tilt angle of the alignment film;
drop-filling liquid crystal molecules on the color film substrate having a seal frame, wherein the liquid crystal molecules are doped with thermal reactive monomers;
aligning and bonding the color film substrate and the corresponding array substrate;
providing a frame around the liquid crystal display panel; and
heat-curing the frame, and simultaneously making the thermal reactive monomers in the liquid crystal molecules into a polymer on a surface of the alignment film, thereby improving an anchoring force of the alignment film to the liquid crystal molecules.

11. The method for manufacturing the liquid crystal display panel of claim 10, wherein the heat-curing has a temperature between 50° C. and 80° C.

12. The method for manufacturing the liquid crystal display panel of claim 10, wherein the heat-curing has an operation time between 10 minutes and 20 minutes.

13. The method for manufacturing the liquid crystal display panel of claim 10, wherein after the step in which the isotropic alignment film is coated, and before the step in which the isotropic alignment film is irradiated by the linearly polarized ultraviolet light, the method further comprises the following step of:
pre-baking the alignment film, so that the alignment film having a uniform thickness, and an organic solvent in the alignment film being volatilized.

14. The method for manufacturing the liquid crystal display panel of claim 13, wherein the pre-baking has a temperature between 80° C. and 90° C.

15. The method for manufacturing the liquid crystal display panel of claim 13, wherein the pre-baking has an operation time between 5 minutes and 10 minutes.

16. The method for manufacturing the liquid crystal display panel of claim 10, wherein after the step in which the alignment film is pre-baked, and before the step in which the isotropic alignment film is irradiated by the linearly polarized ultraviolet light, the method further comprises the following step of:
baking the alignment film at high temperatures, thereby curing the alignment film.

17. The method for manufacturing the liquid crystal display panel of claim 10, wherein after the step in which the isotropic alignment film is irradiated by the linearly polarized ultraviolet light, and before the step in which the liquid crystal molecules are drop-filled on the color film substrate having the seal frame, the method further comprises the following step of:
baking the alignment film at high temperatures, thereby curing the alignment film.

18. The method for manufacturing the liquid crystal display panel of claim 16, wherein the baking at high temperatures has a temperature between 180° C. and 220° C.

19. The method for manufacturing the liquid crystal display panel of claim 16, wherein the baking at high temperatures has an operation time between 40 minutes and 60 minutes.

20. The method for manufacturing the liquid crystal display panel of claim 10, wherein after the step in which the frame is provided around the liquid crystal display panel, and before the step in which the frame is heat-cured, the method further comprises the following step of:
ultraviolet-curing the frame.

* * * * *